United States Patent [19]

Mayer

[11] Patent Number: 4,659,348

[45] Date of Patent: Apr. 21, 1987

[54] EXHAUST GAS PARTICLE FILTER FOR INTERNAL COMBUSTION ENGINES

[75] Inventor: Andreas Mayer, Niederrohrdorf, Switzerland

[73] Assignee: BBC Brown, Boveri & Company, Limited, Baden, Switzerland

[21] Appl. No.: 799,984

[22] Filed: Nov. 20, 1985

[30] Foreign Application Priority Data

Nov. 30, 1984 [CH] Switzerland ................ 5718/84

[51] Int. Cl.$^4$ .............................. B01D 39/20
[52] U.S. Cl. ......................... 55/320; 55/487; 55/488; 55/489; 55/DIG. 30; 55/512; 60/311
[58] Field of Search ............ 55/318, 320, 321, 323, 55/486–489, 512, DIG. 13, DIG. 30; 60/311

[56] References Cited

U.S. PATENT DOCUMENTS

| | | | |
|---|---|---|---|
| 3,365,864 | 1/1968 | Iizima ..................... | 55/529 X |
| 3,853,484 | 12/1974 | Sudar et al. ............ | 60/311 X |
| 3,898,063 | 8/1975 | Gazan ..................... | 55/512 X |
| 4,264,344 | 4/1981 | Ludecke et al. ........ | 55/487 X |
| 4,343,149 | 8/1982 | Abthoff et al. ......... | 60/311 |
| 4,419,113 | 12/1983 | Smith ...................... | 60/311 X |
| 4,436,538 | 3/1984 | Tomita et al. .......... | 55/489 X |

FOREIGN PATENT DOCUMENTS

| | | | |
|---|---|---|---|
| 0129214 | 8/1982 | Japan ..................... | 60/311 |
| 0067914 | 4/1983 | Japan ..................... | 60/311 |
| 0093915 | 6/1983 | Japan ..................... | 60/311 |

*Primary Examiner*—Charles Hart
*Attorney, Agent, or Firm*—Burns, Doane, Swecker & Mathis

[57] ABSTRACT

The exhaust gas particle filter has a parabola shaped recess in the core ensuring that the inlet flow of the exhaust gases is directed towards the central filter part. The latter has a lower degree of separation relative to the outer filter part—caused by increased filter porosity and smaller mass—so that the exhaust gases flow through the central filter part in the initial phase. Its larger filter porosity and the small mass cause the temperature reduction of the exhaust gas flowing through to remain small so that a downstream supercharger can respond rapidly. Since the separation of soot particles initially occurs primarily in the central filter part, rapid deposition occurs—despite its low degree of separation—so that the resistance during the operation following the acceleration phase becomes similar to that of the surrounding outer filter part. The latter then offers the capacity of separating soot particles over a longer period without regeneration.

9 Claims, 3 Drawing Figures

EXHAUST GAS PARTICLE FILTER FOR INTERNAL COMBUSTION ENGINES

BACKGROUND OF THE INVENTION

The present invention concerns an exhaust gas particle filter for internal combustion engines.

The conventional homogeneously constructed exhaust gas particle filters require fine porosity so that the specified total degree of separation can be sufficiently large.

Because of the fine porosity and the small probability or regeneration, choking of the filter is, in the long term, unavoidable. In order to keep the pressure drop caused by the choking of the filter within acceptable limits, a large filter surface is provided. This inevitably involves a large filter mass and, since fine porosity implies almost complete heat exchange, a large time constant. If an exhaust gas particle filter located on the high pressure side is provided for supercharged internal combustion engines, between 10 and 20 seconds generally pass after a cold start before the supercharge pressure has built up.

Although this disadvantage can be mitigated by reducing the volume of the filter, this measure itself leads to unacceptably rapid choking of the filter, which would then cause an increase in back pressure. Increasing the porosity does not produce the desired improvement either because this measure reduces the degree of separation, on the one hand, and must involve an inadequate remedy with respect to the heat storage, on the other.

In supercharged internal combustion engines, it is known practice to pass part of the exhaust gases, over a certain power range of the engine, through a bypass directly in front of the supercharger. If the bypass comes into operation during the acceleration phase, the soot generation is, of course, higher for this period (which is characterised by a heavy load) than it is during the rest of the operation. However, the legal limits are not exceeded overall—despite the unfiltered proportion—because a passenger car in normal operation is only accelerating for a small percentage of the time. An objectional feature of this possibility is that the system can be misused by jamming it in the bypass position and so contradicting the legislative intention. It follows that appropriate safety measures should come into action when the bypass control fails.

It is on this point that the invention is intended to provide a remedy. An objective of the invention, is to achieve specific filtration of the exhaust gases during the whole of the operation, using an exhaust gas particle filter of the type mentioned at the beginning. Another objective of the invention is to remove the heat sink property of the exhaust gas particle filter as far as possible, so that the downstream supercharger can respond rapidly. A further objective of the invention is to make possible the combustion of the soot which has been filtered out, so as to provide continuous regeneration of the exhaust gas particle filter.

SUMMARY OF THE INVENTION

The advantages obtainable by means of the invention can mainly be seen in that the exhaust gas flow, because it follows the path of least resistance, first flows through the central filter part, preferably placed at the downstream end of the recessed core of the exhaust gas particle filter, this central filter part having a lower degree of separation relative to the outer filter part because of increased filter porosity and lower mass. In consequence, the exhaust gases here do not lose much temperature, i.e. the heat sink property of the exhaust gas particle filter is negated to a sufficient extent for a downstream supercharger to respond rapidly. Since the separation of the soot particles initially takes place mainly in the central filter part, rapid deposition occurs within it—despite its low degree of separation—so that the resistance in the operation following the acceleration phase becomes similar to that of the outer filter part. The latter then provides the capacity for filtering soot particles without regeneration over a fairly long period. Because of the temperature profile occurring in the cross-section of the exhaust pipe, the regeneration temperature is reached in a fairly short time in the central filter part; combustion of the soot particles therefore occurs preferentially in this area. Since the volume of the central part of the filter is small, its complete regeneration is possible even if the regeneration conditions only last for a short time. The regeneration is then extended to the complete filter by the exothermal process.

A further advantage of the invention follows from the possibility of designing the outer filter part and the central filter part either with the same type of filter (cell filter or foamed material filter) or as a combination of the types of filter mentioned.

The invention is, of course, also suitable for unsupercharged internal combustion engines. In the case of supercharged internal combustion engines, supercharging is either by mechanical superchargers, exhaust gas turbo-chargers or pressure wave superchargers.

BRIEF DESCRIPTION OF THE DRAWINGS

Embodiment examples of the invention are shown diagrammatically in the drawing.

In this.

All the elements not necessary for direct understanding of the invention are omitted. The flow direction of the working medium is indicated by arrows. The same elements are provided with the same reference signs

DETAILED DESCRIPTION OF PREFERRED EMBODIMENTS OF THE INVENTION

Figure 1:
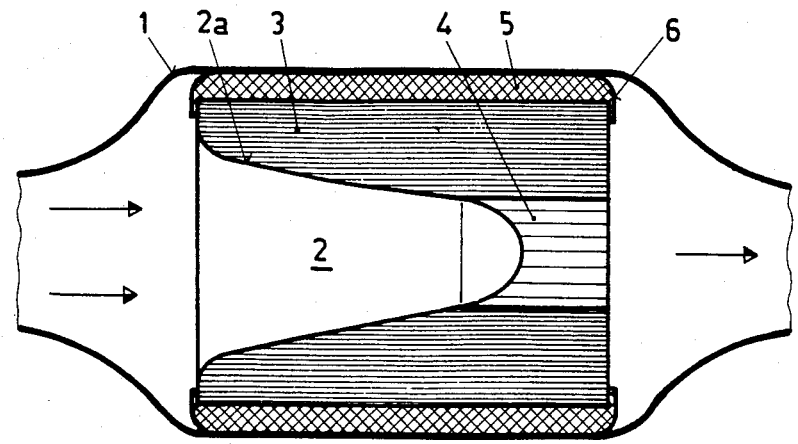
FIG. 1 shows an exhaust gas particle filter with a parabola shaped core recess.

FIG. 1 shows, simplified, the construction of an exhaust gas particle filter 1. The active exhaust gas particle filter 1 shown here has the shape of a cylinder and consists of an outer filter part 3 and a central filter part 4. An insulating layer 5 surrounds the outer filter part 3 and ensures that its cooling is delayed when it is not subjected to flow, for example by approximately 10° C. in five minutes. The insulation layer 5 should, fundamentally, be given the greatest attention because the performance of a downstream supercharger after a stop depends mainly on the magnitude of the reduction in temperature during this period of time. In addition, a good insulating layer 5 ensures that the regeneration temperature is maintained substantially longer and that, in the case of a subsequent regeneration action, the required temperature can occur more rapidly. Not least important, the insulating layer 5 fulfills the duty of protecting neighbouring elements of the exhaust gas particle filter 1 from heat radiation. A sheet 6 protects the insulating layer 5 from effects due to the exhaust gas flow. The recessed core 2 of the exhaust gas particle filter 1 involves both the outer filter part 3 and the central filter part 4 and, for better guidance of the exhaust gas flow, has the shape of a parabola 2a. By this means, the exhaust gas flow is specifically led to the central filter part 4. The latter has greater porosity relative to the outer filter part 3—independent of whether the filter construction is of the cell or foam material principle—as the different shading is intended to help indicate. The central filter part 4 defines a flow path which extends from the inlet side of the filter to the outlet side of the filter independently of the outer filter part 3, as is evident from FIG. 1. That is, some exhaust gas can traverse the filter thrugh the central part 4 without flowing through the outer part 3. When going into service of after a regeneration period, the flow follows the path of least resistance, i.e. the major part of the exhaust gas flow first flows through the central filter part 4. The increased porosity in this region causes the heat exchange to be incomplete; the heating of the filter material therefore lags behind the exhaust gas temperature. In addition, of course, the lower mass of the central filter part 4 stores less heat, i.e. the time constant of this part of the filter has, in consequence, a lower value. Since the exhaust gas particle filter 1 is intrinsically a heat sink, the two effects mentioned therefore have a positive effect, particularly for a downstream supercharger.

It is obvious that the degree of filtration of the central filter part 4, initially and after each regeneration phase, is not 100%—because of the greater porosity provided in this region. No attempt is made to achieve this, for the reasons mentioned above. It can, therefore, be assumed that the partial expulsion of soot, occurring mainly during the acceleration procedure, will be of very short duration because the central filter part 4, in which the soot separation mainly occurs, will soon be choked so that the exhaust gas flow—in the operation following the acceleration phase—will follow the path via the larger outer filter part 3, not yet subject to deposits, because of the increasing resistance of the central filter part 4. The outer filter part 3 thus offers the capacity for separating soot particles without regeneration for a long period.

When the regeneration temperature is reached, the central filter part 4 is heated in a short period and the soot particles deposited there begin to burn. The central filter part 4 becomes fully permeable. Since its volume is small, full regeneration is then possible even if the regeneration conditions only last for a short time.

The ignition of the filtered exhaust gas particles starts at a temperature of 500°-550° C.—provided an oxygen concentration of 3-6% is available.

The probability that the central filter part 4 is clean is therefore much larger than the regeneration of the outer filter part 3.

In general, it should be stated at this point that regeneration follows the Arrhenius law of mass action.

The total degree of separation, referred to the cycle, corresponds to the specified standards because the parts of time with reduced separation through the central filter part 4 are small. If, for example, it is required that in the regenerated condition ⅔ of the exhaust gas quantity shall flow through the central filter part 4 and if its mass is reduced to 10% of that of the outer filter part 3, a large reduction in the flow resistance or a large increase in the porosity, of the order of value of a factor of 20, is necessary, i.e. the average pore size of the central filter part 4 is then around 0.1 mm. The pore size is, of course, matched in an optimum fashion to the particular case.

The outer filter part 3 and the central filter part 4 can be produced from one cast. The extrusion technique is a practical means of manufacture for this purpose. It is also conceivable to manufacture the filter parts individually and to subsequently join them tightly together. The filters themselves are, in the main, manufactured according to the cell or foamed material principle.

The outer filter part 3 and the central filter part 4 can consist of the same type of filter or form, between them, a combination of known types of filter. In the case of different types of filter, it is not necessarily their pore size which is of importance; it is, rather, the actual degree of separation between the individual parts of the filter which must be used as a criterion.

Cell filters of differing pore porosity are only possible in parallel connection.

Relative to these, foam material filters have the advantage that, even in monolithic constructions, parts of differing porosity can be connected in series, thus providing the possibility of dealing in an optimum fashion with the individual case.

If the cell filter type is selected for the outer filter part 3, it is important that the characteristic labyrinth principle of the cell filter should not be lost along the curve of the parabola 2a. It is also conceivable that a catalytic wire mesh mantle can be inserted in the central space of a ceramic outer filter part 3; this wire mesh mantle is quite capable of positively influencing the desired relationship between the degree of separation and the pressure loss.

Figure 2:
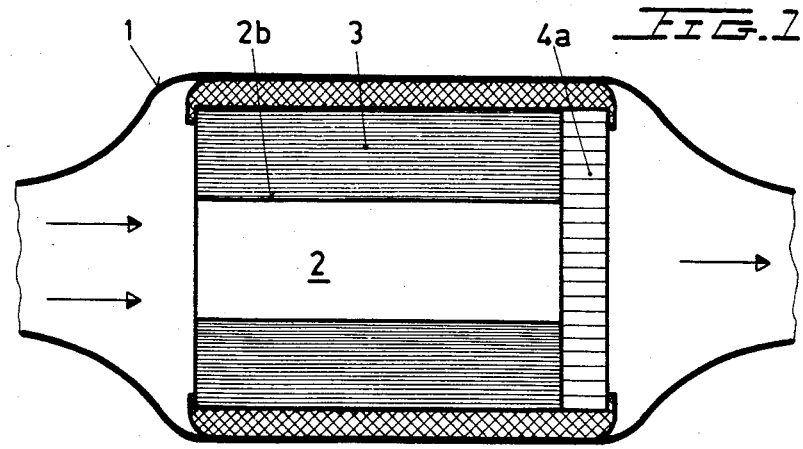
FIG. 2 shows an exhaust gas particle filter with a cylindrical shaped core recess and, FIG. 3 shows an exhaust gas particle filter with an inlet tube.

FIG. 2 shows a further embodiment of the exhaust gas particle filter 1. The core 2 is of cylindrical shape 2b. The connection to the outer filter part 3 is, in this case also, formed by a central filter part 4a whose shape is that of a disc extending over the whole extent of the outer filter part 3; the thickness of the disc can be varied from case to case and as a function of the type of filter selected. Fundamentally, the considerations with respect to degree of separation, pressure losses and temperature reduction discussed under FIG. 1 also apply here. The clear dimension of the core 2 is variable and could, for example, be ⅓ of the diameter of the outer filter part 3. The manufacture of this exhaust gas particle filter 1 is obviously simpler; on the other hand, the inlet flow of the exhaust gases does not appear to be optimum.

Figure 3:
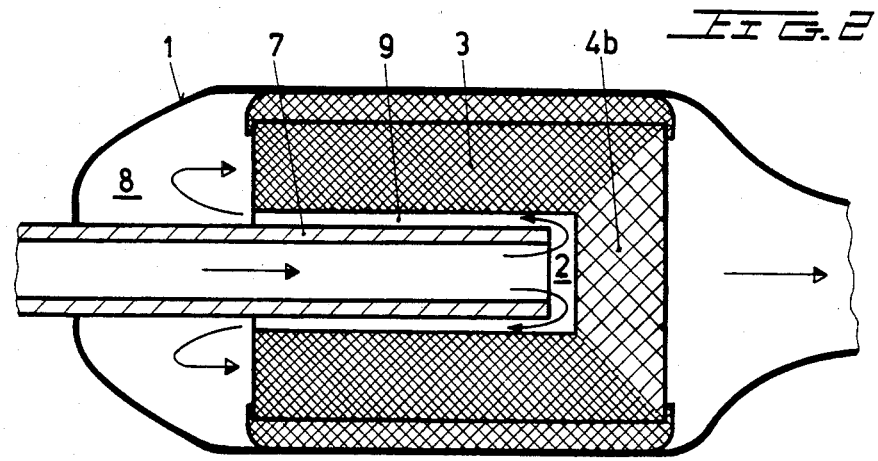

FIG. 3 shows a further embodiment of the exhaust gas particle filter 1. In this case, an attempt is made to improve the inlet flow of the exhaust gases, the latter being passed through a tube 7 directly in front of the central filter part 4b. At this point, the exhaust gases act on the trapezium shaped central filter part 4b until the back pressure caused by the increasing choking due to soot particles becomes so large that the exhaust gases escape via the gap 9 into the chamber 8. From there, they can flow through the outer filter part 3.

This exhaust gas particle filter 1 has a monolithic construction so that the outer filter part 3 and the central filter part 4b can only be characterized by the differing filter porosity. The different shading selected relative to the preceding figures is only intended to state that in the case of a monolithic construction of the exhaust gas particle filter 1, only the foam material type of filter can be used in a sensible manner, for manufacturing reasons.

I claim:

1. Exhaust gas particle filter for internal combustion engines, comprising an exhaust gas particle filter having an inlet side and an outlet side, said filter including an outer filter part and a central filter part, the central filter part having a greater porosity and smaller mass relative to the outer filter part and defining a flow path from said filter inlet side to said filter outlet side independently of said outer filter part.

2. Exhaust gas particle filter according to claim 1, wherein the central filter part is located at a downstream end of the outer filter part.

3. Exhaust gas particle filter according to claim 1, wherein the mass of the central filter part is 10–20% of that of the outer filter part.

4. Exhaust gas particle filter according to claim 1, wherein the outer filter part and the central filter part define a recessed core having a parabola shape.

5. Exhaust gas particle filter according to claim 1, wherein the core of the outer filter part has a cylindrical shape.

6. Exhaust gas particle filter according to claim 1, wherein a tube is disposed in the core portion of the outer filter part.

7. Exhaust gas particle filter according to claim 1, wherein the outer filter part and the central filter part comprise cell-type filters.

8. Exhaust gas particle filter according to claim 1, wherein the outer filter part and the central filter part comprise foam-type filters.

9. Exhaust gas particle filter according to claim 1, wherein one of said outer and central filter parts comprises a cell-type filter and the other comprises a foam-type filter.

* * * * *